US010384294B2

(12) United States Patent
Christopher et al.

(10) Patent No.: US 10,384,294 B2
(45) Date of Patent: Aug. 20, 2019

(54) METHOD AND DEVICE FOR CONTROLLING CURRENT FLOW THROUGH A WELDING CLAMP

(75) Inventors: Mark R. Christopher, Neenah, WI (US); Thomas Don Lahti, Appleton, WI (US); Jeffery Ray Ihde, Greenville, WI (US); Gary A. Thyssen, Appleton, WI (US); Michael Todd Klegin, Greenville, WI (US); Timothy Jay Reitmeyer, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 808 days.

(21) Appl. No.: 13/339,504

(22) Filed: Dec. 29, 2011

(65) Prior Publication Data
US 2013/0168374 A1    Jul. 4, 2013

(51) Int. Cl.
| B23K 9/00 | (2006.01) |
| B23K 9/32 | (2006.01) |
| B23K 37/00 | (2006.01) |
| H01R 11/24 | (2006.01) |

(52) U.S. Cl.
CPC ............ B23K 9/321 (2013.01); B23K 37/006 (2013.01); H01R 11/24 (2013.01); *Y10T 29/49169* (2015.01)

(58) Field of Classification Search
CPC .. B23K 2201/26; B23K 9/0026; B23K 9/038; B23K 9/0213; E01B 11/50
USPC ............... 219/54–60 A, 70, 78.01, 101–116, 219/130.1–133, 137 PS
See application file for complete search history.

(56) References Cited

U.S. PATENT DOCUMENTS

| 3,412,233 A | * | 11/1968 | Wilkie | ................. | B23K 3/0476 219/225 |
| 3,701,877 A | * | 10/1972 | Richardson | ............ | H01R 4/029 219/100 |
| 5,046,958 A | * | 9/1991 | Brown | ............... | B23K 37/0435 219/136 |

(Continued)

FOREIGN PATENT DOCUMENTS

| DE | 199 57 873 A1 | 8/2000 |
| JP | 61 042788 U | 3/1986 |
| JP | 2011 238488 | 11/2011 |

OTHER PUBLICATIONS

International Search Report & Written Opinion for application No. PCT/US2012/071712 dated Mar. 15, 2013.

*Primary Examiner* — Tu B Hoang
*Assistant Examiner* — Thomas J Ward
(74) *Attorney, Agent, or Firm* — McAndrews, Held & Malloy, Ltd.

(57) ABSTRACT

A method and device for controlling current flow through a welding clamp are provided. One welding clamp includes a first contact piece configured to contact a workpiece and to provide a first current path that limits current flow. The welding clamp also includes a second contact piece configured to contact the workpiece and to provide a second current path. When the welding clamp is being clamped to the workpiece, the first contact piece is configured to contact the workpiece prior to the second contact piece. In addition, the welding clamp is configured so that current flows through the first current path prior to flowing through the second current path when the welding clamp is being clamped to the workpiece.

19 Claims, 7 Drawing Sheets

(56) References Cited

U.S. PATENT DOCUMENTS

| | | | | |
|---|---|---|---|---|
| 5,124,520 A | * | 6/1992 | Spendlove | H05B 6/101 |
| | | | | 219/234 |
| 6,657,163 B1 | * | 12/2003 | Blankenship | B23K 9/10 |
| | | | | 219/130.01 |
| 7,427,726 B2 | * | 9/2008 | Enyedy | B23K 9/1336 |
| | | | | 219/136 |
| 2002/0038796 A1 | * | 4/2002 | Leon, Jr. | B23K 9/32 |
| | | | | 219/136 |
| 2011/0288546 A1 | * | 11/2011 | Abbott | A61B 18/085 |
| | | | | 606/41 |

* cited by examiner

METHOD AND DEVICE FOR CONTROLLING CURRENT FLOW THROUGH A WELDING CLAMP

BACKGROUND

The invention relates generally to welding clamps and, more particularly, to a method and device for controlling current flow through a welding clamp.

Welding is a process that has increasingly become ubiquitous in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in an appropriate amount at the desired time. For example, a wire feeder may be used to provide welding wire to a welding operation.

In welding applications employing wire feeders, it may be appreciated that certain wire feeders are voltage sensing wire feeders. Such voltage sensing wire feeders often use welding power to power internal wire feeder components. A return path for the welding power used by the wire feeder may be made by using a cable with a clamp, or other securing mechanism, on one end. The cable connects to the wire feeder and the clamp is secured to a workpiece. Thus, the wire feeder internal components may be powered even while a welding operation is not occurring. As may be appreciated, there may be a voltage potential difference between the clamp and the workpiece before the clamp is connected to the workpiece. Such a voltage potential difference may cause an inrush of current when the clamp is being secured to or removed from the workpiece. Further, other power carrying clamps in welding and non-welding applications may also realize an inrush current when the clamps are being secured to or removed from a connection point. Under certain conditions, the inrush current may mark and/or scar the clamp and connection point. Thus, the clamp and connection point may be degraded by the inrush current. Accordingly, there exists a need in the field for techniques that might limit the amount of inrush current that occurs when a clamp is connected to or removed from a connection point.

BRIEF DESCRIPTION

In one embodiment, a welding clamp for a welding operation includes a first contact piece configured to contact a workpiece and to provide a first current path that limits current flow. The welding clamp also includes a second contact piece configured to contact the workpiece and to provide a second current path. When the welding clamp is being clamped to the workpiece, the first contact piece is configured to contact the workpiece prior to the second contact piece. In addition, the welding clamp is configured so that current flows through the first current path prior to flowing through the second current path when the welding clamp is being clamped to the workpiece.

In another embodiment, a welding system includes a welding power supply configured to provide welding power for a welding operation. The welding system also includes a wire feeder coupled to the welding power supply and configured to provide a welding wire for the welding operation. The welding system includes a clamp configured to be electrically coupled between the wire feeder and a workpiece and to provide a reference for the wire feeder. The clamp has a first contact piece and a second contact piece. The first contact piece is configured to contact the workpiece and to provide a first current path. The second contact piece is configured to contact the workpiece and to provide a second current path. When the clamp is being clamped to the workpiece, the first contact piece is configured to contact the workpiece prior to the second contact piece. The clamp is configured so that current flows through the first current path prior to flowing through the second current path when the clamp is being clamped to the workpiece.

In another embodiment, a method for manufacturing a welding clamp includes electrically coupling a first current limiting device to a first contact piece and electrically coupling the first current limiting device to a welding cable to form a first current path from the first contact piece to the welding cable. The method also includes electrically coupling a second contact piece directly to the welding cable to form a second current path and attaching the first contact piece to the second contact piece to form a first half of the welding clamp.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
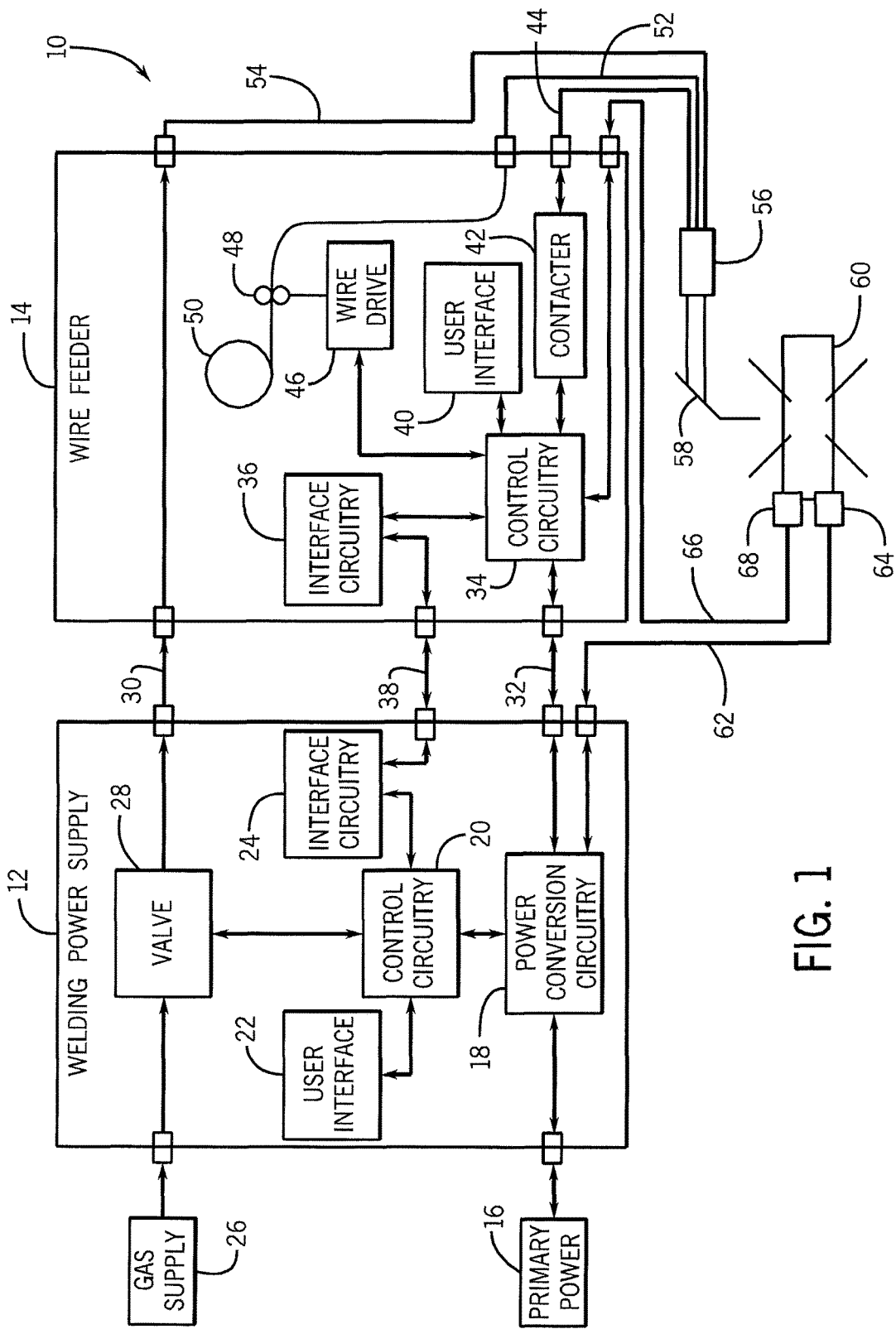
FIG. 1 is a block diagram of an embodiment of a welding system employing a current limiting clamp.

Turning now to the drawings, FIG. 1 is a block diagram of an embodiment of a welding system 10 with a current limiting clamp. In the illustrated embodiment, the welding system 10 is a metal inert gas (MIG) welding system, although the present techniques may be used on other welding systems utilizing a clamp, such as tungsten inert gas (TIG) systems, and so forth. Further, the present techniques may be used in non-welding systems, such as systems with jumper cables, or other systems that utilize clamps for power connections. The welding system 10 powers, controls, and supplies consumables to a welding application. The welding system 10 includes a welding power supply 12 and a voltage sensing wire feeder 14.

The welding power supply 12 receives primary power 16 (e.g., from the AC power grid, an engine/generator set, a battery, or other energy generating or storage devices, or a combination thereof), conditions the primary power, and provides an output power to one or more welding devices in accordance with demands of the system 10. The primary power 16 may be supplied from an offsite location (i.e., the primary power may originate from the power grid). Accordingly, the welding power supply 12 includes power conversion circuitry 18 that may include circuit elements such as transformers, rectifiers, switches, and so forth, capable of converting the AC input power to AC or DC output power as dictated by the demands of the system 10 (e.g., particular welding processes and regimes). Such circuits are generally known in the art.

In some embodiments, the power conversion circuitry 18 may be configured to convert the primary power 16 to both weld and auxiliary power outputs. However, in other embodiments, the power conversion circuitry 18 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 20. The control circuitry 20 includes at least one controller that controls the operations of the welding power supply 12, and may be configured to receive and process a plurality of inputs regarding the performance and demands of the system 10. Furthermore, the control circuitry 20 may include volatile or non-volatile memory, such as ROM, RAM, magnetic storage memory, optical storage memory, or a combination thereof. In addition, a variety of control regimes for various welding processes, along with associated settings and parameters may be stored in the memory along with code configured to provide a specific output (e.g., initiate wire feed, enable gas flow, etc.) during operation.

The welding power supply 12 includes a user interface 22. The control circuitry 20 may receive input from the user interface 22 through which a user may choose a process, and input desired parameters (e.g., voltages, currents, particular pulsed or non-pulsed welding regimes, and so forth). Furthermore, the control circuitry 20 may control parameters input by the user as well as any other parameters. Specifically, the user interface 22 may include a display for presenting, or indicating, information to an operator. The control circuitry 20 uses interface circuitry 24 for communicating data to other devices in the system 10, such as the wire feeder 14.

A gas supply 26 provides shielding gases, such as argon, helium, carbon dioxide, and so forth, depending upon the welding application. A valve 28 controls the flow of gas, and if desired, may be selected to allow for modulating or regulating the amount of gas supplied to a welding operation. The valve 28 may be opened, closed, or otherwise operated by the control circuitry 20 to enable, inhibit, or control gas flow through the valve 28. For example, when the valve 28 is closed, shielding gas may be inhibited from flowing through the valve 28. Conversely, when the valve 28 is opened, shielding gas is enabled to flow through the valve 28.

Shielding gas exits the valve 28 and flows through a cable 30 (which in some implementations may be packaged with the welding power output) to the wire feeder 14 which provides the shielding gas to the welding operation. Welding power flows through a cable 32 to the wire feeder 14. The wire feeder 14 uses the welding power to power the various components in the wire feeder 14, such as to power control circuitry 34. The control circuitry 34 controls the operations of the wire feeder 14. The wire feeder 14 also includes interface circuitry 36 for communicating with the welding power supply 12 using a cable 38. In some embodiments, welding power and data may use the same cable between the welding power supply 12 and the wire feeder 14.

The wire feeder 14 includes a user interface 40. The control circuitry 34 may receive input from the user interface 40, such as via methods and devices described in relation to the user interface 22. Furthermore, the control circuitry 34 may display information to an operator, such as voltage, current, wire speed, wire type, and so forth. A contactor 42 (e.g., high amperage relay) is controlled by the control circuitry 34 and configured to enable or inhibit welding power to flow to a weld power cable 44 for the welding operation. In certain embodiments, the contactor 42 may be an electromechanical device, while in other embodiments the contactor 42 may be any other suitable device, such as a solid state device. The wire feeder 14 includes a wire drive 46 that receives control signals from the control circuit 34 to drive rollers 48 that rotate to pull wire off a wire spool 50. The wire is provided to the welding operation through a cable 52. Likewise, the wire feeder 14 may provide shielding gas through a cable 54. As may be appreciated, the cables 44, 52, and 54 may be bundled together with a coupling device 56.

A torch 58 uses the wire, welding power, and shielding gas for a welding operation. Further, the torch 58 is used to establish a welding arc between the torch 58 and a workpiece 60. A work cable 62, which may be terminated with a clamp 64 (or another power connecting device), couples the welding power supply 12 to the workpiece 60 to complete a welding power circuit. As illustrated, a voltage sense cable 66 is coupled from the wire feeder 14 to the workpiece 60 using a sense clamp 68 (or another power connecting mechanism). The wire feeder 14 is connected to the welding power supply 12 so that it may operate even when a welding arc is not formed by the torch 58. Specifically, the wire feeder 14 receives welding power from the welding power supply 12 through cable 32. The welding power is connected to the various components in the wire feeder 14 (e.g., control circuitry 34, wire drive 46, user interface 40, interface circuitry 36). A return path for the wire feeder 14 power is formed using the sense cable 66 with the sense clamp 68 connected to the workpiece 60. Further, the work cable 62 with the work clamp 64 provide the final portion of the return path to the welding power supply 12. Thus, the return path includes the cable 66, the workpiece 60, and the cable 62.

As may be appreciated, the work cable clamp 64 may be connected to the workpiece 60 prior to the sense clamp 68 being connected to the workpiece 60. Further, the sense clamp 68 may be the last portion of the wire feeder 14 power circuit that is to be connected for the wire feeder 14 to be powered. It should be noted that there may be a voltage potential difference between the workpiece 60 and the sense clamp 68. In such a condition, when the sense clamp 68 is connected to the workpiece 60 an inrush of current may flow between the sense clamp 68 and the workpiece 60. Such an inrush of current may cause marks and/or scars on the workpiece 60 and the sense clamp 68. As may be appreciated, a similar result may occur when the clamp 64 is connected to or removed from the workpiece 60. Therefore, the clamps 64 and 68 may be configured to be current limiting clamps as will be described in FIGS. 2 through 5. For example, the clamps 64 and 68 may be configured so that, when the clamps 64 and 68 are being connected and when the clamps 64 and 68 are being disconnected, a current limiting device is used to limit the current flow between the workpiece 60 and the clamps 64 and 68. Further, the clamps 64 and 68 may be configured to allow normal current flow while the clamps 64 and 68 remain connected to the workpiece 60.

It should be noted the voltage potential between the sense clamp 68 and the workpiece 60 may exist because the welding power supply 12 and/or the wire feeder 14 are powered on when the sense clamp 68 is being connected to the workpiece 60. Therefore, the voltage potential may be eliminated by powering off the welding power supply 12 and/or the wire feeder 14 before connecting or disconnecting clamps 64 and 68. However, under certain conditions, it may not be practical for a welding operator to power off the welding power supply 12 and/or the wire feeder 14 before connecting or removing the clamps 64 and 68. For example, a welding operator may be performing a weld in a remote location from the welding power supply 12 and may need to adjust the position or location of the clamps 68 and 64. Therefore, the current limiting devices described herein may be used to limit the effect of a voltage potential that may exist between the clamps 64 and 68 and the workpiece 60.

Figure 2:
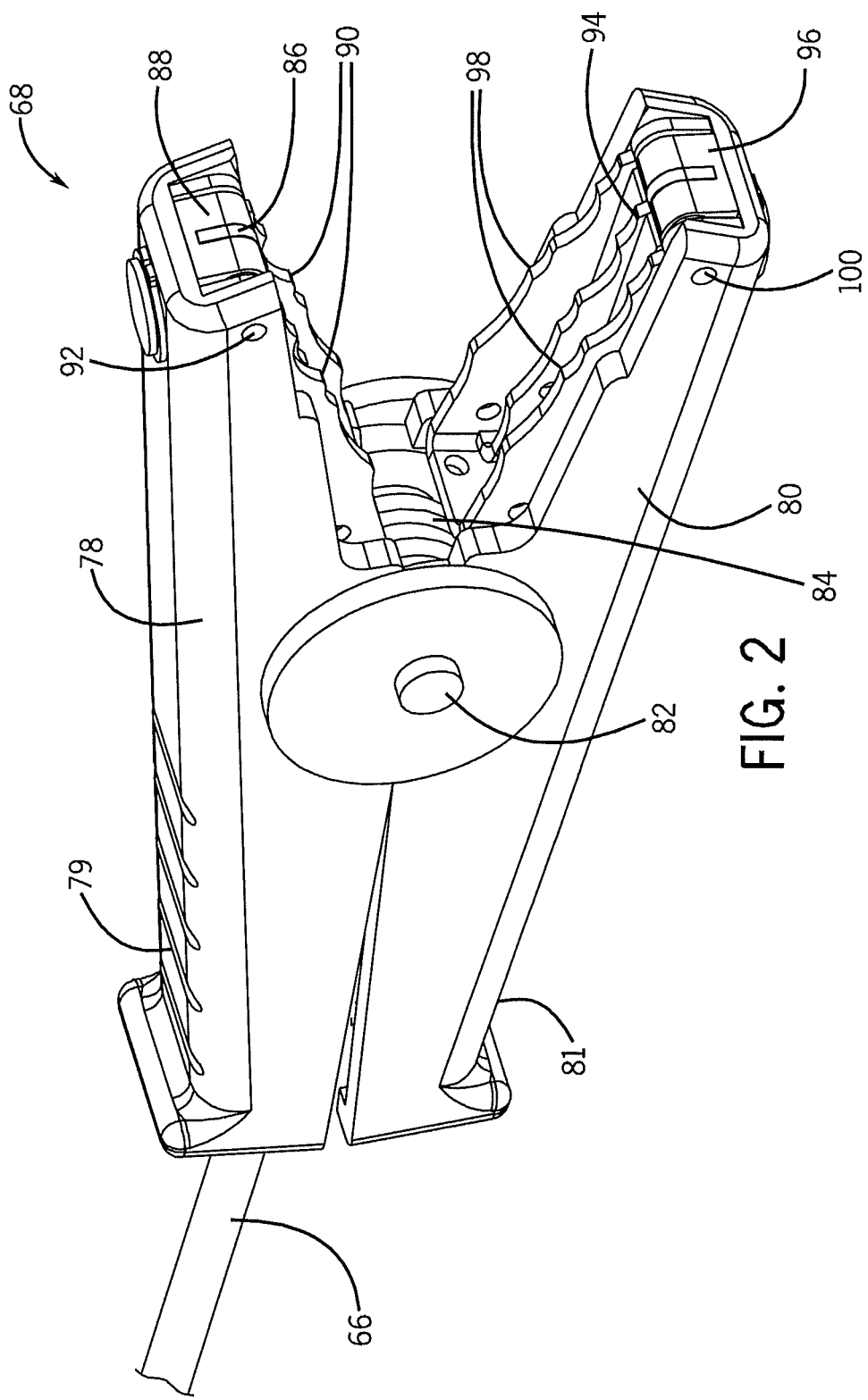
FIG. 2 is a perspective view of an embodiment of a current limiting clamp.

FIG. 2 is a perspective view of an embodiment of a current limiting clamp, such as the work cable clamp 64 or the sense clamp 68. It should be noted that the current limiting clamp may be any type of clamp, power connection device, or power connection mechanism. The clamp 68 is divided into two clamp halves, an upper clamp half 78 and a lower clamp half 80. The clamp halves 78 and 80 are illustrated in an open position, which occurs when handles 79 and 81 are pressed together. The clamp 68 transitions to a closed position when pressure is removed from the handles 79 and 81. A rivet 82 extends through the clamp halves 78 and 80 to hold the halves together. Further, the rivet 82 extend through a torsion spring 84 positioned between the clamp halves 78 and 80. The torsion spring 84 exerts a force on the handles 79 and 81 to press them apart when a user is not applying pressure to the handles 79 and 81 by squeezing them together.

The upper clamp half 78 includes an inner jaw 86 that is mounted in a jaw mount 88. The inner jaw 86 is secured to the jaw mount 88 so that the inner jaw 86 does not move when the clamp 68 is opened or closed. The upper clamp half 78 also includes an outer jaw 90. The outer jaw 90 is mounted to the jaw mount 88, but the outer jaw 90 is configured so both sides of the jaw 90 are raised above the inner jaw 86 (in relation to the jaw mount 88) when the clamp 68 is in the open position. In such a configuration, the outer jaw 90 will contact an item to be clamped before the inner jaw 86. Specifically, only the outer jaw 90 will contact the item to be clamped until the outer jaw 90 is pressed toward the inner jaw 86. When the clamp 68 transitions to the closed position, the outer jaw 90 is pressed toward the inner jaw 86 so that both the inner jaw 86 and the outer jaw 90 press against the item to be clamped, such as the workpiece 60 illustrated in FIG. 1. Conversely, when the clamp 68 transitions to the open position, the inner jaw 86 removes contact with the item being clamped before the outer jaw 90 removes contact with the item to be clamped. As may be appreciated, the jaw mount 88 is secured to the upper clamp half 78 by positioning the jaw mount 88 within the locking slot 92.

The lower clamp half 80 is constructed in a similar manner to the upper clamp half 78. Specifically, the lower clamp half 80 includes an inner jaw 94 that is mounted in a jaw mount 96. The inner jaw 94 is secured to the jaw mount 96 so that the inner jaw 94 does not move when the clamp 68 is opened or closed. The lower clamp half 80 also includes an outer jaw 98. The outer jaw 98 is mounted to the jaw mount 96, but the outer jaw 98 is configured so both sides of the jaw 98 are raised above the inner jaw 94 (in relation to the jaw mount 96) when the clamp 68 is in the open position. In such a configuration, the outer jaw 98 will contact an item to be clamped before the inner jaw 94. Specifically, only the outer jaw 98 will contact the item to be clamped until the outer jaw 98 is pressed toward the inner jaw 94. When the clamp 68 transitions to the closed position, the outer jaw 98 is pressed toward the inner jaw 94 so that both the inner jaw 94 and the outer jaw 98 press against the item to be clamped, such as a conductive surface (e.g., workpiece). Conversely, when the clamp 68 transitions to the open position, the inner jaw 94 removes contact with the item being clamped before the outer jaw 98 removes contact with the item to be clamped. As may be appreciated, the jaw mount 96 is secured to the lower clamp half 80 by positioning the jaw mount 96 within the locking slot 100. As will be described in FIGS. 4 and 5, current flowing through the outer jaws 90 and 98 may be limited while current flowing through the inner jaws 86 and 94 may not be limited. Thus, while the clamp 68 is being clamped the initial current flow through the clamp 68 will be current limited and when the clamp 68 is being removed the final current flow through the clamp 68 will be current limited. It should be noted that in certain embodiments, only the upper clamp half 78 may contain current limiting circuitry, only the lower clamp half 80 may contain current limiting circuitry, or both the upper clamp half 78 and the lower clamp half 80 may contain current limiting circuitry. Further, some embodiments of the clamp 68 may use a mechanism other than outer and inner jaws to limit the current flow.

Figure 3:
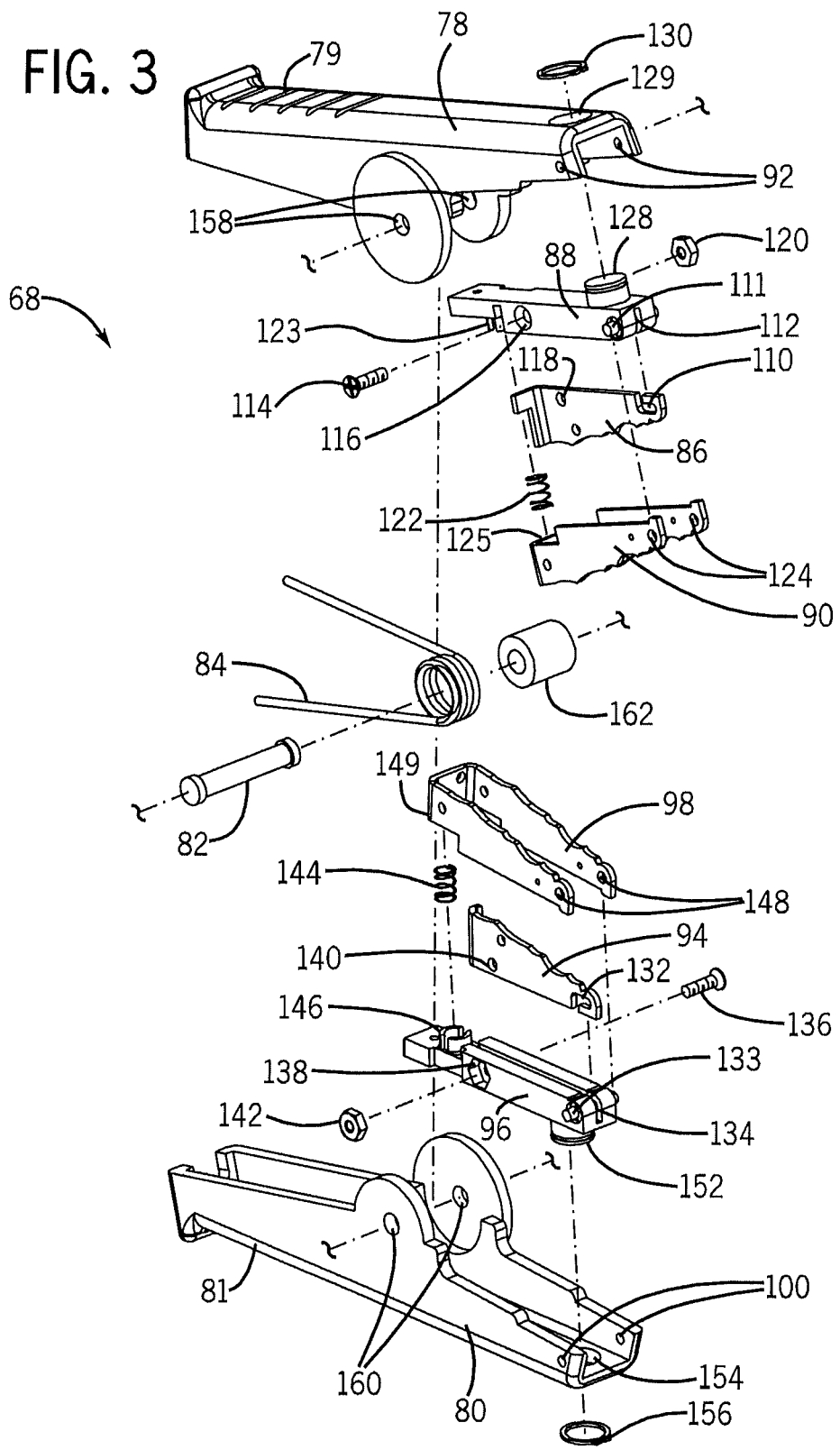
FIG. 3 is an exploded view of an embodiment of a current limiting clamp.

FIG. 3 is an exploded view of an embodiment of a current limiting clamp illustrating how the clamp 68 (or the clamp 64) may be assembled. Specifically, the upper clamp half 78 (i.e., first jaw assembly) is assembled by latching a hook 110 in the inner jaw 86 on a pin 111 extending through a slot 112 of the jaw mount 88. The inner jaw 86 is further attached to the jaw mount 88 by inserting a bolt 114 through an opening 116 in the jaw mount 88 and an opening 118 in the inner jaw 86. A nut 120 is secured to the bolt 114 to hold the inner jaw 86 and the jaw mount 88 together. A spring 122 is inserted into a retainer 123 on the jaw mount 88. Openings 124 in the outer jaw 90 are positioned so the pin 111 extends into the openings 124. An end 125 of the outer jaw 90 abuts the spring 122. As such, the spring 122 exerts force against the outer jaw 90 to press the outer jaw 90 to be raised further above the jaw mount 88 than the inner jaw 86. Further, the outer jaw 90 is movably (or rotatably) mounted to the jaw mount 88, rotating about the connection at the openings 124. An extension 128 of the jaw mount 88 is inserted into an opening 129 in the upper clamp half 78. A retaining ring 130 is positioned around the extension 128 to hold the jaw mount 88 to the upper clamp half 78.

The lower clamp half 80 (i.e., second jaw assembly) is assembled in a similar manner to the upper clamp half 78. Specifically, a hook 132 in the inner jaw 94 latches on a pin 133 extending through a slot 134 of the jaw mount 96. The inner jaw 94 is further attached to the jaw mount 96 by inserting a bolt 136 through an opening 138 in the jaw mount 96 and an opening 140 in the inner jaw 94. A nut 142 is secured to the bolt 136 to hold the inner jaw 94 and the jaw mount 96 together. A spring 144 is inserted into a retainer 146 on the jaw mount 96. Openings 148 in the outer jaw 98 are positioned so the pin 133 extends into the openings 148. An end 149 of the outer jaw 98 abuts the spring 144. As such, the spring 144 exerts force against the outer jaw 98 to press the outer jaw 98 to be raised further above the jaw mount 96 than the inner jaw 94. Further, the outer jaw 98 is movably (or rotatably) mounted to the jaw mount 96, rotating about the connection at the openings 148. An extension 152 of the jaw mount 96 is inserted into an opening 154 in the lower clamp half 80. A retaining ring 156 is positioned around the extension 152 to hold the jaw mount 96 to the lower clamp half 80.

During assembly, the rivet 82 extends through the openings 158 and 160 to hold the upper clamp half 78 and the lower clamp half 80 together. Further, a bushing 162 is positioned around the rivet 82 with the torsion spring 84 around the bushing 162. Thus, the torsion spring 84 is supported within the clamp 68 and positioned to exert a force against the handles 79 and 81 of the clamp 68. As may be appreciated, certain embodiments may use different parts than those illustrated to cause one piece of the clamp 68 to contact a conductive surface prior to another piece of the clamp 68. For example, certain embodiments may replace the torsion spring 84 with a compression spring, o-rings, spring steel, bent plastic, etc.

Figure 4:
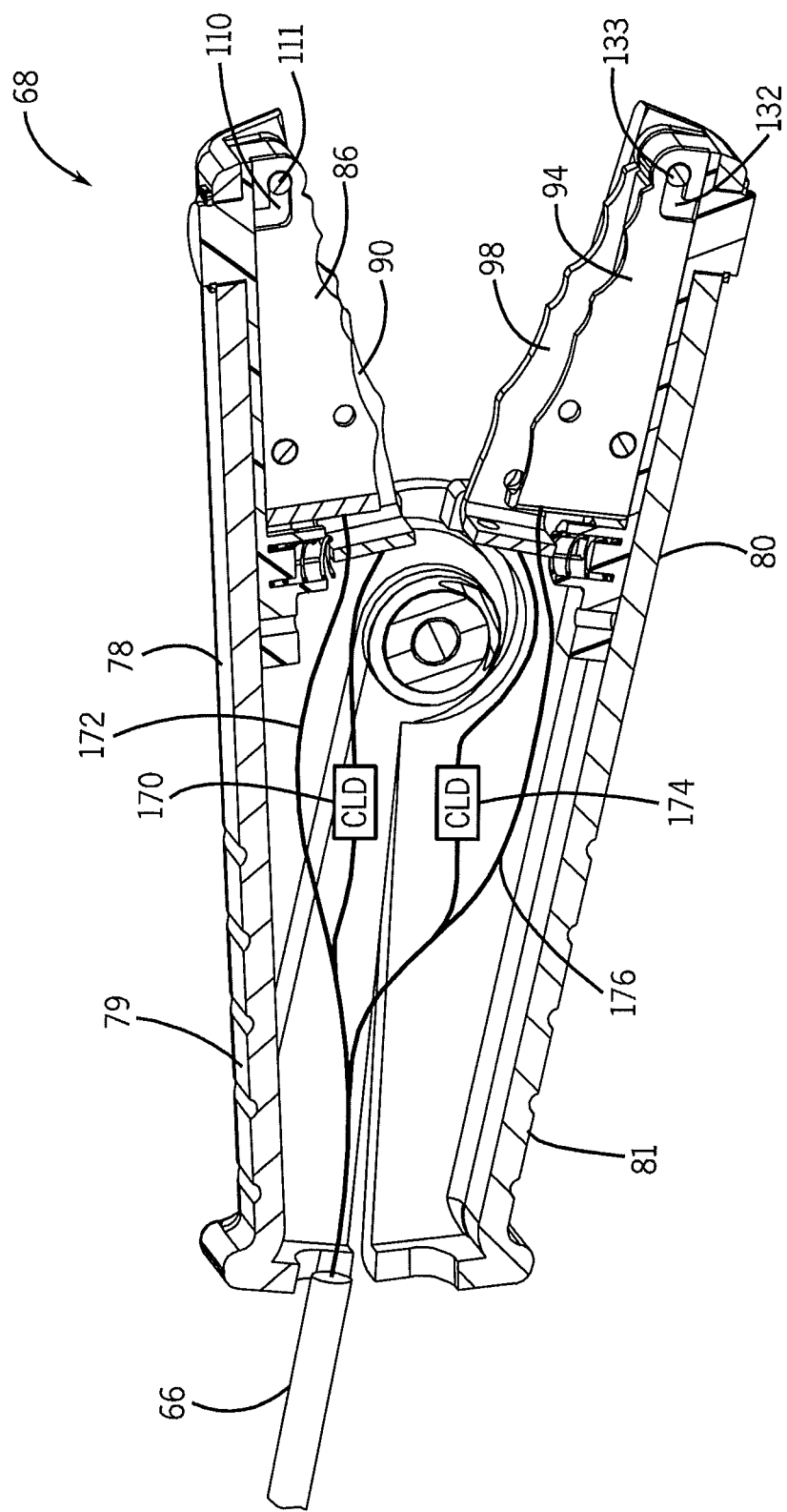
FIG. 4 is a cross-sectional view of an embodiment of a current limiting clamp in an open or unclamped position.

FIG. 4 is a cross-sectional view of an embodiment of a current limiting clamp in the open or unclamped position. As illustrated, a current limiting device (CLD) 170 is electrically coupled between the outer jaw 90 (i.e., first contact piece) of the upper clamp half 78 and the cable 66 (which may be coupled to the wire feeder 14 of FIG. 1). As may be appreciated, the CLD 170 may be any device that limits the amount of current flowing between the outer jaw 90 and the cable 66. For example, the CLD 170 may be a resistor, a positive temperature coefficient (PTC) thermistor, a negative temperature coefficient (NTC) thermistor, an inductor, or some other current limiting device. Further, the CLD 170 may have a resistance or impedance. In certain embodiments, the CLD 170 may be a resistor with a large resistance such as approximately 10 to 50 ohms. Further, in other embodiments, the CLD 170 may be a PTC thermistor, such as a PTC thermistor with part number TR600-150F-EX-2 available for purchase from Tyco Electronics Corp. of Berwyn, Pa., or another similar part.

A wire 172 is electrically coupled between the inner jaw 86 (i.e., second contact piece) of the upper clamp half 78 and the cable 66. As such, current flow through the wire 172 is only limited by the size of the wire 172. Therefore, the wire 172 may generally be considered as not current limiting. Thus, while the CLD 170 limits the current flow between the clamp 68 and the cable 66, the wire 172 does not limit the current flow between the clamp 68 and the cable 66.

When the clamp is being used, the upper clamp half 78 contacts a conductive surface, such as the surface of the workpiece 60 of FIG. 1. Because the outer jaw 90 is raised further from the jaw mount 88 than the inner jaw 86, the outer jaw 90 will contact the conductive surface first. When this occurs, an electric current will flow between the cable 66 and the conductive surface. This current will flow through the CLD 170 which will limit the current flow, thereby decreasing the impact of the voltage potential difference between the conductive surface and the clamp 68. As may be appreciated, in certain embodiments, the voltage potential difference may be approximately 0 to 80 volts, or more. However, with the flow of the electric current through the outer jaw 90 first, the outer jaw 90 will reach the voltage potential of the workpiece 60. As the clamp 68 becomes clamped on the conductive surface, both the outer jaw 90 and the inner jaw 86 will contact the conductive surface. When this occurs, the electric current may flow through the CLD 170 and the wire 172. However, the wire 172 has a much lower resistance (or impedance) than the CLD 170. Therefore, a majority of the electric current will flow through the wire 172 and will allow the device connected to the cable 66 (e.g., wire feeder 14) to operate at a desired current. Further, it should be noted that when the outer jaw 90 and the inner jaw 86 both contact the conductive surface, the jaws 86 and 90 will have the same voltage potential as the workpiece 60.

Conversely, when the clamp 68 is being removed from the conductive surface, the outer jaw 90 will remain in contact with the conductive surface after the inner jaw 86 removes contact with the conductive surface (due to the spring 122 pressing the outer jaw 90 away from the jaw mount 88). Therefore, when the clamp 68 is being removed, current will change from flowing through the wire 172 and the CLD 170 to only flow through the CLD 170 until the outer jaw 90 removes contact with the conductive surface. The lower clamp half 80 mirrors the upper clamp half 78 in its wiring and operation. Specifically, a CLD 174 is coupled between the outer jaw 98 (i.e., third contact piece) of the lower clamp half 80 and the cable 66. Further, a wire 176 is coupled between the inner jaw 94 (i.e., fourth contact piece) and the cable 66.

Figure 5:
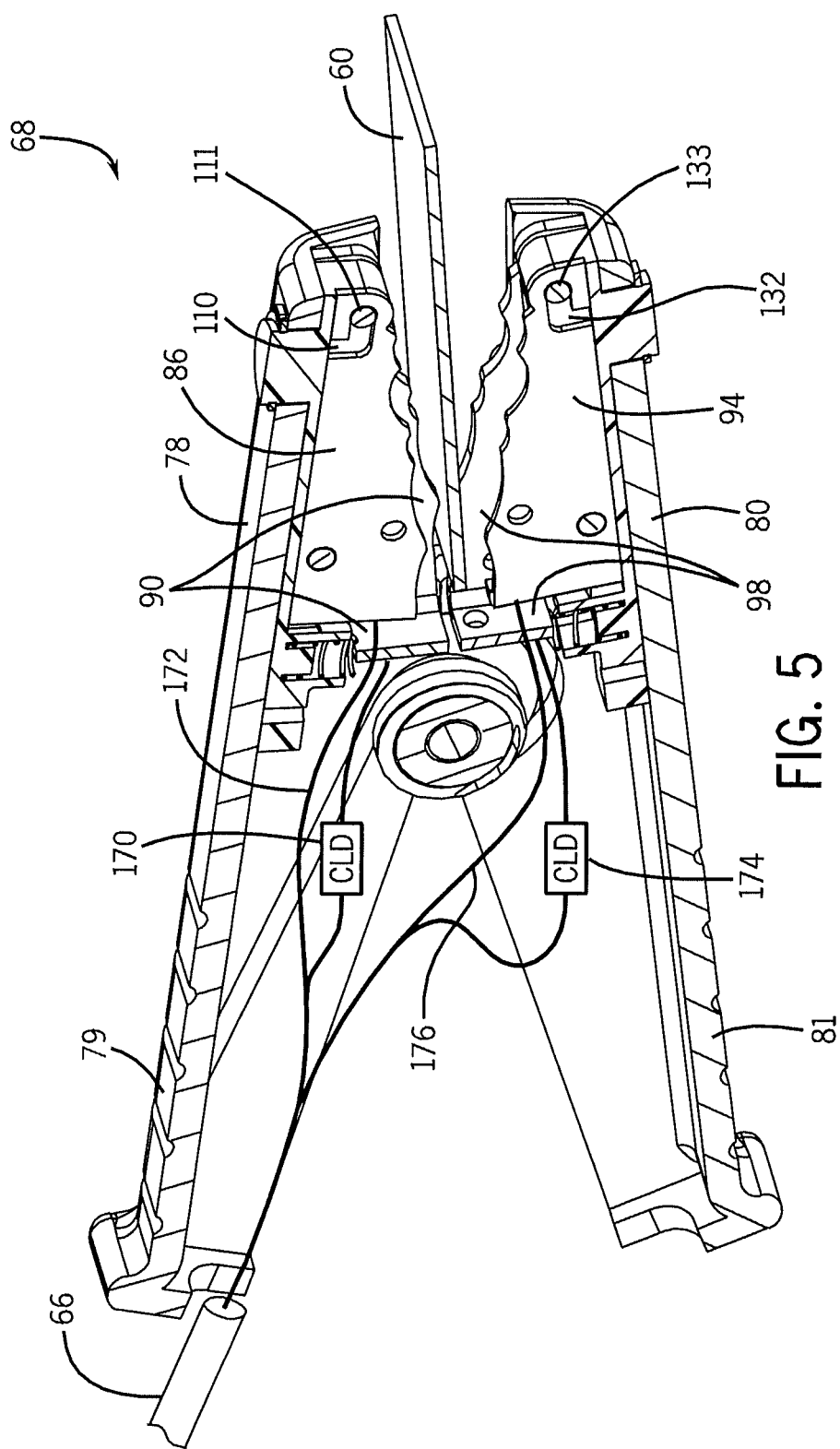
FIG. 5 is a cross-sectional view of an embodiment of a current limiting clamp in a partially closed or clamped position.

FIG. 5 is a cross-sectional view of a current limiting clamp in a partially closed or clamped position. As illustrated, the outer jaw 90 of the upper clamp half 78 is pressed against the workpiece 60 (i.e., a conductive surface), and the inner jaw 86 is not pressed against the workpiece 60. Likewise, the outer jaw 98 of the lower clamp half 80 is pressed against the workpiece 60, and the inner jaw 94 is not pressed against the workpiece 60. In such a position, current will only flow through the CLDs 170 and 174, and not through the wires 172 and 176. Therefore, current flow will be limited by the CLDs 170 and 174. Further, there will be a voltage drop across the CLDs 170 and 174 that causes a lower available voltage for devices attached to the cable 66.

Figure 6:
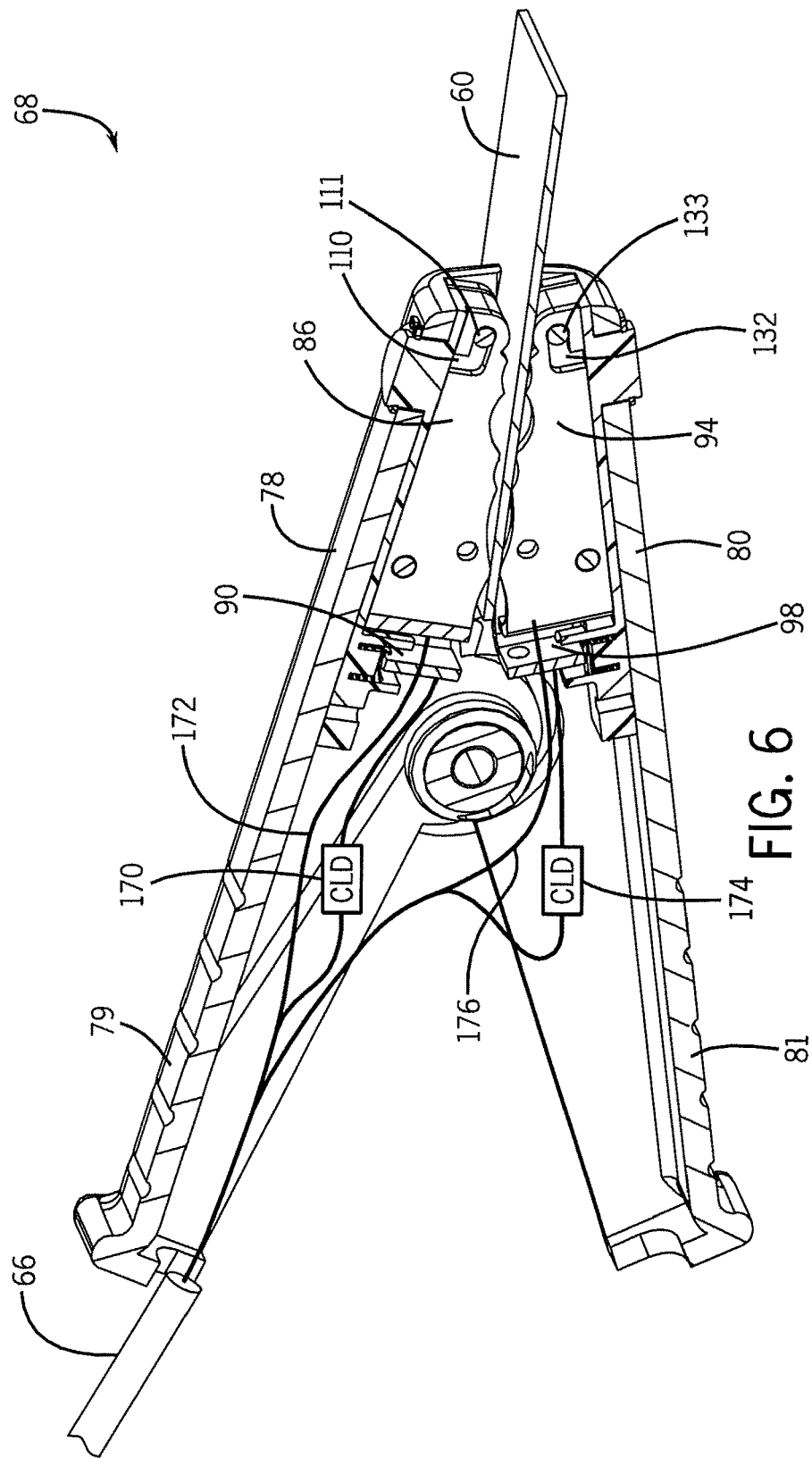
FIG. 6 is a cross-sectional view of an embodiment of a current limiting clamp in a closed or clamped position.

FIG. 6 is a cross-sectional view of a current limiting clamp in the closed or clamped position. As illustrated, the inner jaw 86 and the outer jaw 90 of the upper clamp half 78 both press against the workpiece 60 (i.e., a conductive surface). Likewise, the inner jaw 94 and the outer jaw 98 of the lower clamp half 80 both press against the workpiece 60. In such a position, more current flowing between the cable 66 and the workpiece 60 will flow through the wires 172 and 176 than the CLDs 170 and 174. Therefore, there is no voltage drop across the CLDs 170 and 174 and the system will supply voltage through cable 66 that is not decreased by a voltage drop across the CLDs 170 and 174. As may be appreciated, the techniques described herein can be used when constructing a clamp that can be used for any purpose (e.g., for welding applications or for non-welding applications). Further, using the techniques described herein a current limiting clamp may be produced without increasing the size of the clamp and with minimal increase in the cost of the clamp.

Figure 7:
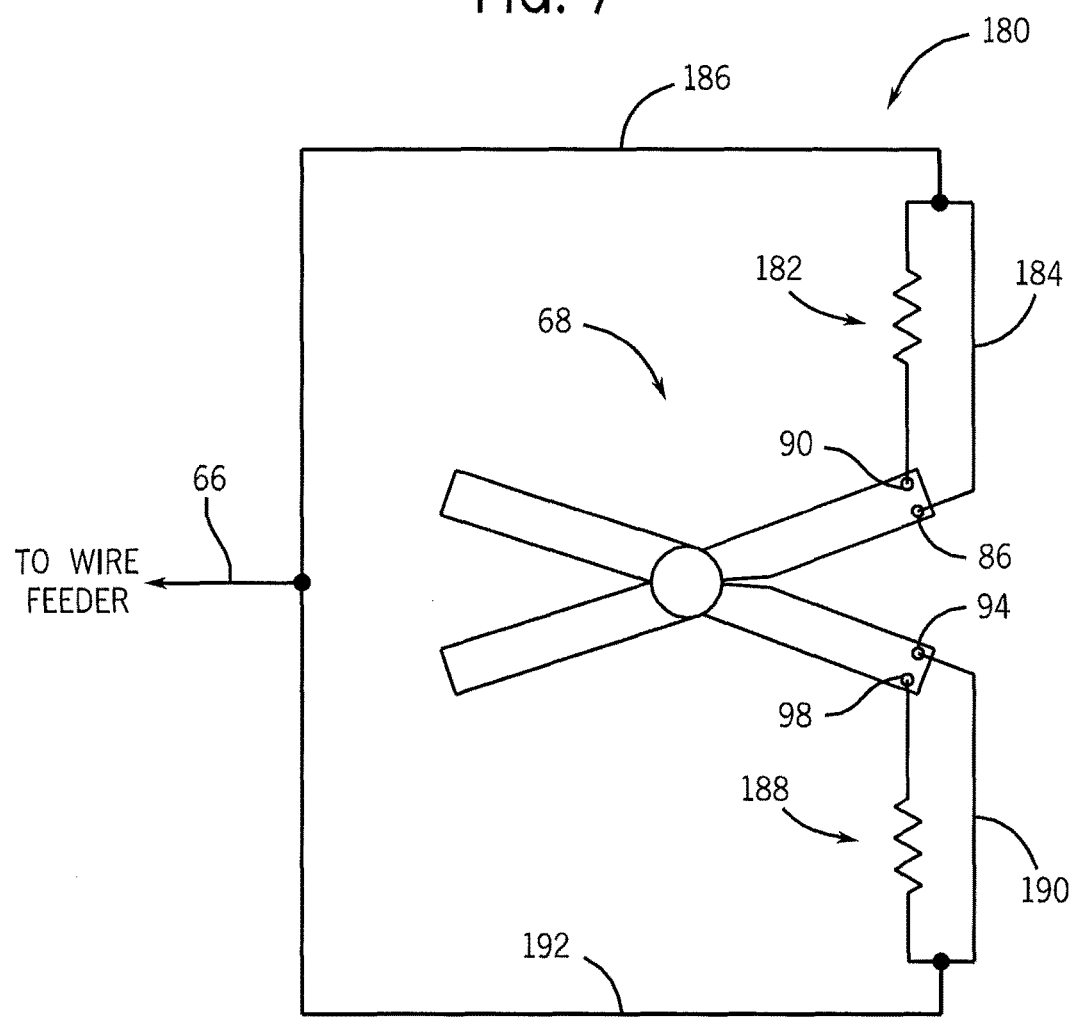
FIG. 7 is a schematic diagram of an embodiment of a current limiting clamp.

FIG. 7 is a schematic diagram 180 of an embodiment of a current limiting clamp. As depicted, a CLD 182 (e.g., resistor, PTC, etc.) is coupled to the outer jaw 90 and a wire 184 is coupled to the inner jaw 86. Further, a wire 186 couples the CLD 182 and the wire 184 to the sense cable 66. Similarly, a CLD 188 is coupled to the outer jaw 98 and a wire 190 is coupled to the inner jaw 94. In addition, a wire 192 couples the CLD 188 and the wire 190 to the sense cable 66. In such a configuration, if the outer jaws 90 and/or 98 contact a conductive surface without the inner jaws 86 and 94 contacting the conductive surface, current flow will be limited by the CLDs 182 and/or 188. Conversely, if the inner jaws 86 and/or 94 contact the conductive surface, current flow will not be limited by the CLDs 182 and/or 188. Thus, the CLDs 182 and/or 188 allow making or breaking a clamp connection with limited current, yet the clamp 68 is configured to operate at its full potential when fully clamped.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding clamp for a welding operation comprising:
hand-operated upper and lower clamp portions configured to be clamped to a workpiece; and
a voltage sense cable, separate from a weld power circuit through the workpiece, configured to electrically couple the workpiece to a wire feeder,
wherein:
  one of the upper and lower clamp portions comprises:
    a first contact piece moveably coupled to the one of the upper and lower clamp portions and configured to contact the workpiece and to provide a first current path via the voltage sense cable between the workpiece and the wire feeder that limits current flow between the workpiece and the wire feeder; and
    a second contact piece rigidly coupled to the one of the upper and lower clamp portions and configured to contact the workpiece and to provide a second current path via the voltage sense cable between the workpiece and the wire feeder in parallel to the first current path; and
  when the welding clamp is being clamped to the workpiece, the first contact piece is configured to contact the workpiece prior to the second contact piece and the welding clamp is configured to enable current to flow through the first current path prior to enabling current to flow through the second current path.

2. The welding clamp of claim 1, wherein, when the welding clamp is being removed from the workpiece, the first contact piece is configured to contact the workpiece after the second contact piece removes contact with the workpiece and the welding clamp is configured so that current flows through the first current path after discontinuing flow through the second current path.

3. The welding clamp of claim 1, wherein the first current path has a higher resistance or impedance than the second current path.

4. The welding clamp of claim 1, wherein, when the first contact piece and the second contact piece both contact the workpiece, the welding clamp is configured so that a greater amount of current flows through the second current path than through the first current path.

5. The welding clamp of claim 1, comprising a third contact piece configured to contact the workpiece and to provide a third current path, and a fourth contact piece configured to contact the workpiece and to provide a fourth current path.

6. The welding clamp of claim 5, wherein, when the welding clamp is being clamped to the workpiece, the third contact piece is configured to contact the workpiece prior to the fourth contact piece and the welding clamp is configured so that current flows through the third current path prior to flowing through the fourth current path.

7. The welding clamp of claim 6, wherein, when the welding clamp is being removed from the workpiece, the third contact piece is configured to contact the workpiece after the fourth contact piece removes contact with the workpiece and the welding clamp is configured so that current flows through the third current path after discontinuing flow through the fourth current path.

8. The welding clamp of claim 6, wherein the third and fourth contact pieces are on the other of the upper and lower clamp portions.

9. A welding system comprising:
a welding power supply configured to provide welding power for a welding operation;
a wire feeder coupled to the welding power supply and configured to provide a welding wire for the welding operation;
a clamp configured to be electrically coupled between the wire feeder and a workpiece and to provide a reference for the wire feeder, the clamp having hand-operated upper and lower clamp portions configured to be clamped to the workpiece; and
a voltage sense cable, separate from a weld power circuit through the workpiece, configured to electrically couple the workpiece to the wire feeder,
wherein:
  one of the upper and lower clamp portions comprises:
    a first contact piece moveably coupled to the one of the upper and lower clamp portions;
    a second contact piece rigidly coupled to the one of the upper and lower clamp portions,
    the first contact piece is configured to contact the workpiece and to provide a first current path via the voltage sense cable between the workpiece and the wire feeder that limits current flow between the workpiece and the wire feeder, and
    the second contact piece is configured to contact the workpiece and to provide a second current path via the voltage sense cable, parallel to the first current path, between the workpiece and the wire feeder, and,
  when the clamp is being clamped to the workpiece, the first contact piece is configured to contact the workpiece prior to the second contact piece and the clamp is configured to enable current to flow through the first current path prior to enabling current to flow through the second current path.

10. The welding system of claim 9, wherein the clamp comprises a current limiting device electrically coupled between the wire feeder and the first contact piece and the second contact piece is electrically coupled directly to the wire feeder without a current limiting device.

11. The welding system of claim 10, wherein the current limiting device comprises a resistor.

12. The welding system of claim 10, wherein the current limiting device comprises a positive temperature coefficient thermistor, a negative temperature coefficient thermistor, or an inductor.

13. The welding system of claim 9, wherein the clamp is configured to limit an amount of current that flows between the workpiece and the clamp while the clamp is being clamped to or unclamped from the workpiece.

14. The welding system of claim 9, wherein, when the clamp is being removed from the workpiece, the first contact piece is configured to contact the workpiece after the second contact piece removes contact with the workpiece and the clamp is configured so that current flows through the first current path after discontinuing flow through the second current path.

15. A welding system for a welding operation comprising:
a work cable clamp configured to couple a welding power supply to a workpiece to complete a welding power circuit through the workpiece; and
a voltage sense clamp comprising:
   hand-operated upper and lower clamp portions configured to be clamped to the workpiece; and
   a voltage sense cable, separate from a weld power circuit through the workpiece, configured to electrically couple the workpiece to a wire feeder,
   wherein:
      one of the upper and lower portions comprises:
         a first contact piece moveably coupled to the one of the upper and lower clamp portions and configured to contact the workpiece and to provide a first current path via the voltage sense cable between the workpiece and the wire feeder that limits current flow between the workpiece and the wire feeder; and
         a second contact piece rigidly coupled to the one of the upper and lower clamp portions and configured to contact the workpiece and to provide a second current path via the voltage sense cable between the workpiece and the wire feeder in parallel to the first current path; and
   wherein, when the voltage sense clamp is being clamped to the workpiece, the first contact piece is configured to contact the workpiece prior to the second contact piece and the voltage sense clamp is configured to enable current to flow through the first current path prior to enabling current to flow through the second current path,
   the first current path prior to enabling current to flow through the second current path.

16. The welding system of claim 15, wherein the voltage sense clamp comprises a spring that biases the first contact piece to a contact position.

17. The welding system of claim 16, wherein the spring is inserted into a retainer on a jaw mount of the voltage sense clamp.

18. The welding system of claim 15, wherein the first current path and the second current path are configured to have an electric coupling to a cable, and wherein the first current path has a higher resistance or impedance than the second current path.

19. The welding system of claim 18, wherein:
the first current path limits current flow between the electric coupling and the first contact piece, and
the second current path has a lower resistance between the electrical coupling and a second jaw than the first current path, thereby limiting current in the first current path when the first contact piece contacts the workpiece and allowing current to flow through the second current path with the lower resistance when the second contact piece contacts the workpiece.

* * * * *